(12) United States Patent
Li (10) Patent No.: US 8,970,194 B2
(45) Date of Patent: Mar. 3, 2015

(54) SWITCH MODE POWER SUPPLY SYSTEM WITH DUAL RAMP COMPENSATION ASSOCIATED CONTROLLER AND METHOD

(71) Applicant: Chengdu Monolithic Power Systems Co., Ltd., Chengdu (CN)

(72) Inventor: Yike Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 190 days.

(21) Appl. No.: 13/706,273

(22) Filed: Dec. 5, 2012

(65) Prior Publication Data

US 2013/0141069 A1    Jun. 6, 2013

(30) Foreign Application Priority Data

Dec. 5, 2011    (CN) .......................... 2011 1 0397881

(51) Int. Cl.
*G05F 1/00*    (2006.01)
*G05F 1/575*    (2006.01)

(52) U.S. Cl.
CPC ...................................... *G05F 1/575* (2013.01)
USPC ........... 323/282; 323/283; 323/284; 323/285; 323/288

(58) Field of Classification Search
USPC .......................... 323/282, 283, 284, 285, 288
See application file for complete search history.

(56) References Cited

U.S. PATENT DOCUMENTS

| | | | |
|---|---|---|---|
| 8,593,124 B2 * | 11/2013 | Nakamura | 323/284 |
| 8,614,872 B2 * | 12/2013 | Nakamura | 361/93.1 |
| 2007/0120547 A1 * | 5/2007 | Tateishi et al. | 323/282 |
| 2009/0128112 A1 * | 5/2009 | Xu et al. | 323/282 |
| 2010/0134080 A1 | 6/2010 | Ouyang | |
| 2010/0181983 A1 | 7/2010 | Ouyang | |
| 2011/0174801 A1 * | 7/2011 | Schwerman | 219/509 |
| 2012/0146606 A1 | 6/2012 | Li | |
| 2013/0099761 A1 * | 4/2013 | Dong et al. | 323/271 |

* cited by examiner

*Primary Examiner* — Emily P Pham
(74) *Attorney, Agent, or Firm* — Perkins Coie LLP (57) ABSTRACT

A switch mode power supply system has a constant on-time signal generator, a logic circuit, a feedback circuit, a first ramp signal generator, a second ramp signal generator, a switch circuit having a power switch, and a comparator. A feedback signal from the feedback circuit is compensated by the first ramp signal generator, and a reference signal is compensated by the second ramp signal generator. The comparator compares the compensated feedback signal with the compensated reference signal to indicate an off time of the power switch while the constant on-time signal generator decides the on-time of the power switch.

12 Claims, 6 Drawing Sheets

SWITCH MODE POWER SUPPLY SYSTEM WITH DUAL RAMP COMPENSATION ASSOCIATED CONTROLLER AND METHOD

CROSS-REFERENCE TO RELATED APPLICATION(S)

This application claims the benefit of CN application No. 201110397881.1, filed on Dec. 5, 2011, and incorporated herein by reference.

TECHNICAL FIELD

The present invention generally relates to electronic circuit, and more particularly but not exclusively relates to a switch mode power supply system, associated controller and control method.

BACKGROUND

Constant on-time control is widely applied in the area of power supply because of its excellent load transient response, simple circuitry structure and smooth operation mode switching.

Figure 1:
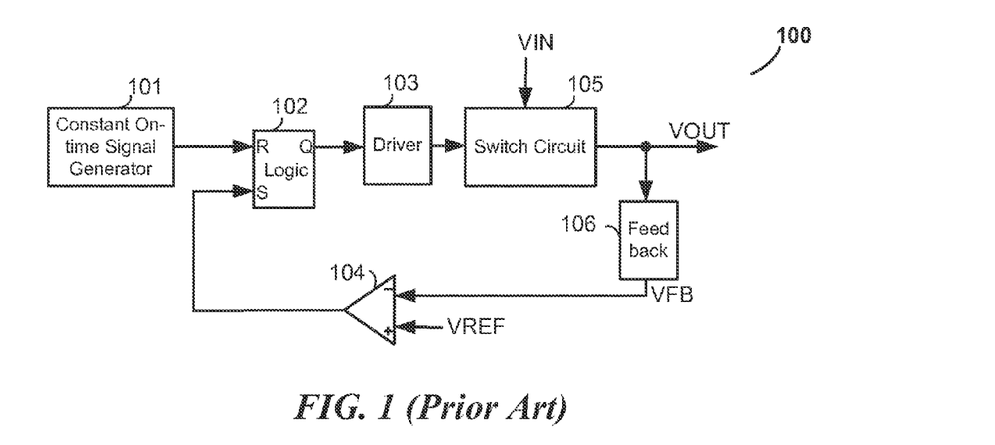
FIG. 1 illustrates a prior art constant on-time switch mode power supply system 100.

FIG. 1 illustrates a constant on-time switch mode power supply 100 as a prior art. The power supply 100 comprises constant on-time signal generator 101, a logic circuit 102, a driver circuit 103, a comparator 104, a feedback circuit 106 and a switch circuit 105. The switch circuit 105 comprises at least a power switch configured to convert an input signal VIN to an output signal VOUT by turning the power switch on and off. The feedback circuit 106 is coupled between an output terminal of the switch circuit 105 and an inverting terminal of the comparator 104, configured to generate a feedback signal VFB to reflect the output signal VOUT. The feedback signal is provided to the inverting terminal of the comparator 104. A non-inverting terminal of the comparator 104 receives a reference signal VREF. The comparator 104 compares the feedback signal VFB with the reference signal VREF. The constant on-time signal generator generates a constant on-time signal to a reset terminal of the logic circuit 102. A set terminal of the logic circuit 102 is coupled to an output terminal of the comparator 104. A control signal is generated according to the constant on-time signal and a comparative result of the comparator 104. The control signal is provided to an input terminal of the driver circuit 103. A driver signal of the driver circuit 103 drives the power switch in switch circuit 105 on and off.

When the switch mode power supply is operating in steady state, the output signal VOUT has a ripple. The control of the power switch in switch circuit 105 depends on the ripple of the output signal VOUT. When the equivalent series resistance (ESR) of an output capacitor in switch circuit 105 is relatively large, the output ripple of the output signal VOUT is also relatively large, which results that the average voltage of the output signal VOUT is larger than a desired value. However, if the ESR of the output capacitor is relatively small, the output ripple of VOUT is also very small. The switch mode power supply is tended to be disturbed, and thereby the output stability is affected.

SUMMARY

One embodiment of the present invention discloses a switch mode power supply system, wherein the switch mode power supply system comprises a switch circuit that comprises a power switch and a controller, wherein the controller comprises a feedback circuit, coupled to an output of the switch mode power supply, configured to generate a feedback signal that is based on an output signal of the switch mode power supply; a first ramp signal generator, coupled to the switch circuit, configured to generate a first ramp signal, the first ramp signal generator compensating the feedback signal with the first ramp signal to generate a compensated feedback signal; a comparator, having an inverting input terminal receiving the compensated feedback signal, and a non-inverting terminal coupled to a reference signal, and an output terminal generating a comparative result; a constant on-time signal generator, generating a constant on-time signal; and a logic circuit, coupled to the constant on-time signal generator and the output terminal of the comparator, configured to generate a control signal to control the power switch turning ON and OFF.

BRIEF DESCRIPTION OF THE DRAWINGS

Non-limiting and non-exhaustive embodiments are described with reference to the following drawings. The drawings are only for illustration purpose.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 2:
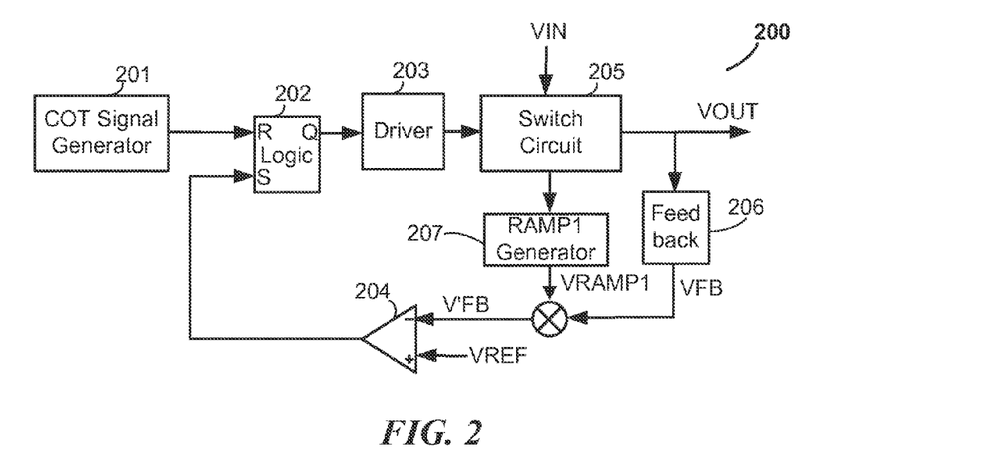
FIG. 2 illustrates a block diagram of a switch-mode power supply system 200 according to an embodiment of the present invention.

FIG. 2 illustrates a block diagram of a switch-mode power supply system 200 according to an embodiment of the present invention. Power supply system 200 comprises a constant on-time (COT) signal generator 201, a logic circuit 202, a driver circuit 203, a comparator 204, a feedback circuit 206, a first ramp (RAMP1) signal generator 207 and a switch circuit 205.

Feedback circuit 206 generates a feedback signal VFB. The feedback signal VFB is compensated by first ramp signal generator 207 and then a compensated feedback signal V'FB is obtained and provided to an inverting terminal of comparator 204. In one embodiment, first ramp signal generator 207 generates a first ramp signal VRAMP1 according to an output signal of a power switch in switch circuit 205, configured to compensate the feedback signal VFB. The comparator 204 compares the compensated feedback signal V'FB with a reference signal VREF, and obtains a comparative result accordingly. Then the comparative result is sent to a set terminal S of the logic circuit 202.

The constant on-time signal generator 201 generates a constant on-time signal and sends it to a reset terminal R of the logic circuit 202. The logic circuit 202 generates a control signal PWM according to the constant on-time signal and the comparative result of the comparator 204. The control signal SW is provided to an input terminal of the driver circuit 203. A driver signal of the driver circuit 203 is configured to drive the power switch of switch circuit 205 turning ON and OFF.

The first ramp signal VRAMP1 in switch-mode power supply system 20 may enhance the stability of switch-mode power supply system. However, with the first ramp signal VRAMP1, the inverting input of comparator 204 receives a compensated feedback signal V'FB, for example, a sum of the feedback signal VFB and the first ramp signal VRAMP1. The average voltage level of this sum is larger than the reference signal VREF, which may results the actual value of the output signal VOUT higher than the desired value.

Figure 3:
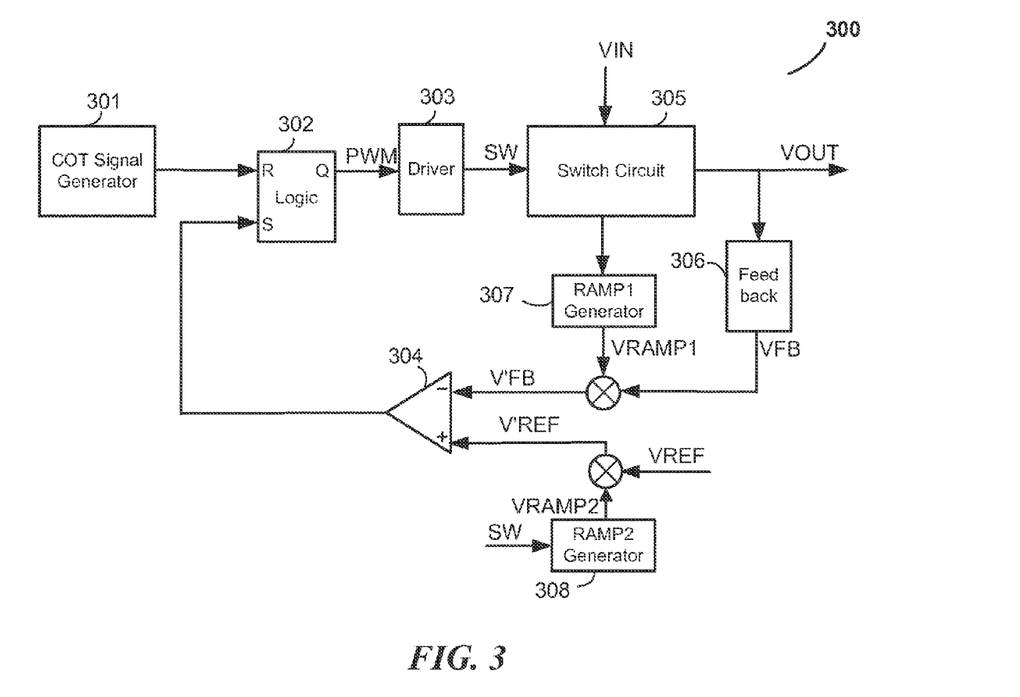
FIG. 3 illustrates a schematic block diagram of a switch-mode power supply system 300 according to an embodiment of the present invention.

FIG. 3 illustrates a schematic block diagram of a switch-mode power supply system 300 according to an embodiment of the present invention. Power supply system 300 comprises a switch circuit 305 and a controller. Switch circuit 305 at least comprises a power switch, through turning on and off of which an input signal VIN is converted to an output signal VOUT. Switch circuit 305 may be applied a direct current to direct current (DC-DC) topology, e.g. synchronous or non-synchronous buck converter, synchronous or non-synchronous boost converter, fly-back converter, forward converter, and etc.

The controller comprises a constant on-time (COT) signal generator 301, a logic circuit 302, a driver circuit 303, a comparator 304, a feedback circuit 306, a first ramp (RAMP1) signal generator 307 and a second ramp signal generator 308. Feedback signal 306 generates a feedback signal VFB. The feedback signal VFB is compensated by the first ramp signal generator 307 so that a compensated feedback signal V'FB is obtained. The compensated feedback signal V'FB is provided to an inverting input terminal of the comparator 304. In one embodiment, the first ramp signal generator 307 generates a first ramp signal VRAMP1. The first ramp signal VRAMP1 compensates the feedback signal VFB to obtain a compensated feedback signal V'FB, and then the V'FB is send to an inverting terminal of comparator 304.

Second ramp (RAMP2) signal generator 308 generates a second ramp signal VRAMP2 according to a driver signal SW which is generated from the driver circuit 303 and drives the power switch, configured to compensate a reference signal VREF to obtain a compensated reference signal V'REF. In another embodiment, the second ramp signal VRAMP2 may be according to a control signal PWM which is generated by the logic circuit 302. The compensated reference signal V'REF is then sent to a non-inverting terminal of the comparator 304. In one embodiment, the comparator 304 compares the sum of the feedback signal VFB and the first ramp signal VRAMP1, i.e. the compensated feedback signal V'FB, with the sum of the reference signal V'FB and the second ramp signal VRAMP2, i.e. the compensated reference signal V'REF. A comparative result is consequently generated and provided to a set terminal S of the logic circuit 302.

Constant on-time signal generator 301 generates a constant on-time signal and sends it to a reset terminal R of the logic circuit 302. Logic circuit 302 generates the control signal PWM according to the comparative result and the constant on-time signal. The control signal PWM is provided to an input terminal of driver circuit 303. The driver signal SW of driver circuit 303 is configured to drive the power switch in switch circuit 305 turning ON and OFF.

Figure 4:
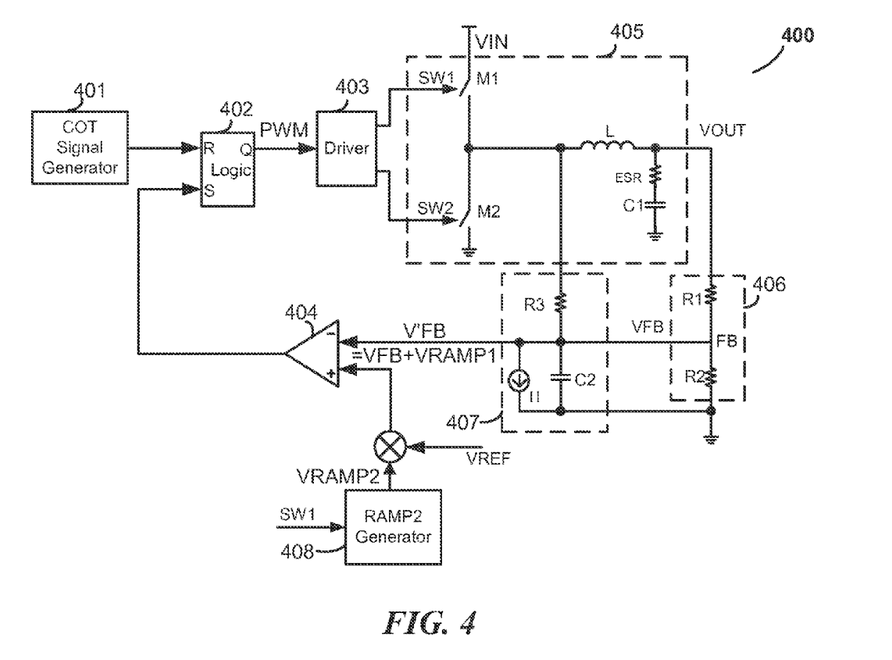
FIG. 4 illustrates a schematic circuitry diagram of a switch-mode power supply system 400 according to an embodiment of the present invention.

FIG. 4 illustrates a schematic circuitry diagram of a switch-mode power supply system 400 according to an embodiment of the present invention. In the illustrated embodiment, a switch circuit 405 utilizes a topology of synchronous buck converter, comprising a high side power switch M1, a low side switch M2, an inductor L and a capacitor C1. Through operating switches M1 and M2 in complementary, the switch circuit 405 converts an input signal VIN into an output signal VOUT. A first terminal of the high side switch M1 receives the input signal VIN and a second terminal is coupled to a first terminal of the low side switch M2. A second terminal of the low side switch M2 is connected to a reference ground. The high side switch M1 receives a first driver signal SW1 from a driver circuit 403, while the low side switch M2 receives an second driver signal SW2 from the driver circuit 403, wherein the driver signals SW1 and SW2 are complementary signals, configured to respectively control the high side switch M1 and the low side switch M2 alternatively turning ON and OFF. A first terminal of the inductor L is coupled to the common node of the high side switch M1 and the low side switch M2. The capacitor C1 is coupled between a second terminal of the inductor L and the reference ground. In certain embodiments, the high side switch M1 and the low side M2 may be bipolar junction transistor (BJT), or metal oxide semiconductor field effect transistor (MOSFET). In other embodiments, a non-synchronous buck converter which comprise a may be applied, and the low side switch M2 may be replaced by a diode.

A feedback circuit 406 receives the output signal VOUT, and accordingly generates a feedback signal VFB configured based on the output signal VOUT. The feedback signal VFB is compensated by a first ramp signal generator 407, and then sent to an inverting terminal of a comparator 404.

Feedback circuit 406 comprises a voltage divider composed by two resistors R1 and R2. A first terminal of the resistor R1 is coupled to an output terminal of the switch circuit 405, while a second terminal of R1 is coupled to a first terminal of the resistor R2. A second terminal of R2 is connected to the reference ground. The common node of the resistors R1 and R2 forms a feedback node FB, configured to generate the feedback signal VFB.

Comparator 404 receives a compensated feedback signal V'FB which is equal to a sum of the feedback signal VFB and a first ramp signal VRAMP1 generated from the first ramp signal generator 407. A non-inverting terminal of the comparator 404 receives a reference signal V'REF compensated by the second ramp signal VRAMP2, e.g. a sum of the reference signal VREF and the second ramp signal VRAMP2. Comparator 404 further compares the compensated feedback signal V'FB with the compensated reference signal V'REF.

In one embodiment, when the output signal VOUT is lower than a given value, i.e. the sum of the feedback signal VFB and the first ramp signal VRAMP1, i.e. V'FB, is no larger than the sum of the reference signal VREF and the second ramp signal VRAMP2, comparator 404 generates a high level comparative result to set a logic circuit 402. Consequently by means of the driver circuit 403, a high level output of logic circuit 402 turns on the high side switch M1 on and turns off the low side switch M2, so that the output signal VOUT rises. Therefore, the compensated feedback signal V'FB correspondingly rises. As the high side switch M1 keeps turning on for a constant time, the compensated feedback signal V'FB reaches a peak point. By this time a constant on-time signal generator 401 generates a constant on-time signal to reset the logic circuit 402. Thus the logic circuit 402 is reset to provide a low level output. The low level output of logic circuit 402 turns off the high side switch M1 and turns off the low side switch M2 through the driver circuit 403. Thereby the output signal VOUT begins to decline, which makes the sum of the feedback signal VFB and the first ramp signal VRAMP1 also decline. Once the sum of the feedback signal VFB and the first ramp signal VRAMP1 touches the sum of the reference signal VREF and the second ramp signal VRAMP2 again, the high side switch M1 will be turned on again. This process is repeated configured to regulate the output signal VOUT.

The first ramp signal generator 407 provides a first ramp signal VRAMP1 with relatively large amplitude on the inverting terminal of comparator 404 which serves as an equivalent series resistor (ESR) of the capacitor C1. In one embodiment, the first ramp signal is a voltage signal, having the same phase with and proportional to the ripple of the inductor current.

In the illustrated embodiments shown in FIG. 4, the first ramp signal generator 407 comprises a resistor R3, a capacitor C2 and a current source I1. The resistor R3 is coupled between the common node of the high side switch M1 and the low side switch M2, and the feedback node FB. The capacitor C2 is coupled between the feedback node FB and the reference ground. The current source I1 is coupled with the capacitor C2 in parallel. The operation of the resistor R3 and the capacitor C2 generates an alternating component with relative large amplitude as the first ramp signal VRAMP1 on the feedback node FB. Simultaneously, the resistor R3 also introduces a new DC current on the node FB, the value of this current is:

$$\frac{VOUT - VFB}{R3} \quad (1)$$

Hence the output current of the current source I1 is $$I1 = \frac{VOUT - VFB}{R3} \quad (2)$$

The current source I1 is configured to neutralize the newly added DC current on the node FB.

With the first ramp signal VRAMP1, the inverting terminal of comparator 404 receives the compensated feedback signal V'FB, the average value of which are increased larger than the given reference signal VREF. It leads that the actual output signal VOUT is larger than desired result. Therefore, one feature of the illustrated embodiment is that a second ramp signal is utilized to compensate the reference signal.

Second ramp signal generator 408 is coupled to the non-inverting input terminal of the comparator 404, configured to generate a second ramp signal VRAMP2 to compensate the reference signal VREF, e.g. coupling the second ramp signal VRAMP2 into the reference signal VREF. In one embodiment, the signal on the non-inverting input terminal of the comparator 404 is the compensated reference signal V'REF which is equal to VREF+VRAMP2. As a result, the average value of the compensated feedback signal V'FB on the inverting input terminal of comparator 404 is pulled back. In some embodiments, a various types of ramp signal generators may be applied as second ramp signal generator 408 configure to generate a suitable second ramp signal VRAMP2 to make the average value of the compensated signal V'FB substantially equal to the given reference signal VREF, and further to regulate the voltage converter to obtain an accurate output signal VOUT.

One skilled in relevant art may understand that in other embodiments, the second ramp signal VRAMP2 may compensate the reference signal VREF according to other suitable regulations. For example, in another embodiment, V'REF=k× VRAMP2+m×VREF, wherein k and m are constant factors.

Figure 5:
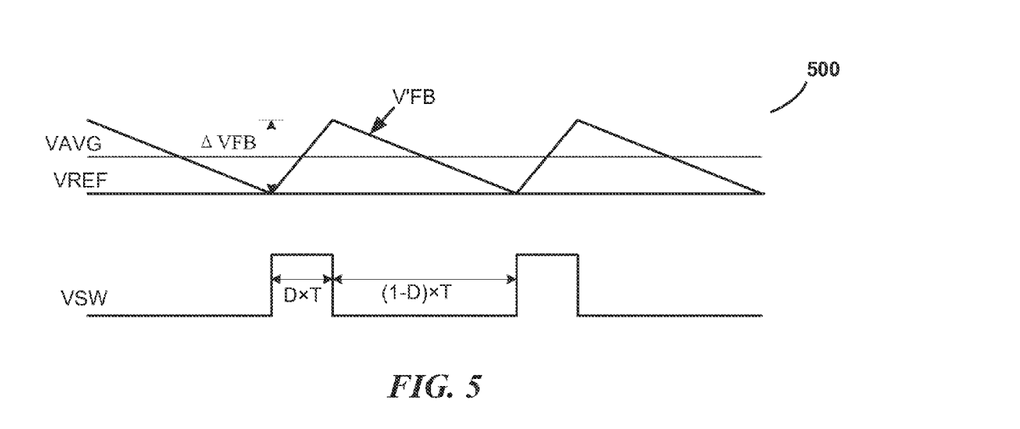
FIG. 5 illustrates a schematic wave-form diagram of the switch-mode power supply system 400 with the second ramp signal generator 408 disabled.

FIG. 5 is a schematic wave-form diagram of the voltage converter 400 with the second ramp signal generator 408 disabled. When the high side switch M1 is on and the low side switch M2 is off, the current flowing through the inductor L rises gradually, and the feedback signal VFB and the compensated feedback signal V'FB (e.g., VFB+VRAMP) correspondingly rise. When the high side switch M1 is on for a constant time DT, the value of VFB+VRAMP1 reaches a maximum point, and the increment OVFB of the compensated feedback signal V'FB is shown as formula (3)

$$\Delta VFB = \quad (3)$$
$$\frac{I \times t}{C2} = \frac{\left(\frac{VIN - VFB}{R3} - \frac{VOUT - VFB}{R3}\right) \times DT}{C3} = \frac{VOUT \times (1 - D)T}{R3 \times C2}$$

Wherein, D is the duty-cycle of the high side switch M1, and T is the switching cycle of the high side switch M1.

The high side switch M1 is turned off and the low side switch M2 is turned on when the constant on time DT has past. After then, the current flowing through the inductor L, as well as the feedback signal VFB and the compensated feedback signal V'FB (VFB+VRAMP1) is gradually decreased. Once the V'FB falls to the reference signal VFB, the high side switch M1 is turned on again and the low side switch M2 is turned off. The inductor current increases again. The above operational process is repeated to realize the regulation of the output signal VOUT.

With the introduction of the first ramp signal VRAMP1, the average value VAVG of the voltage on the inverting terminal of comparator 404 is larger than the reference signal VREF, resulting that the actual output signal VOUT is larger than the desired value. The average value VAVG is illustrated in formula (4)

$$VAVG = \frac{1}{2}\Delta VFB + VREF = \frac{VOUT \times (1 - D)T}{2 \times R3 \times C2} + VREF \quad (4)$$

Figure 6:
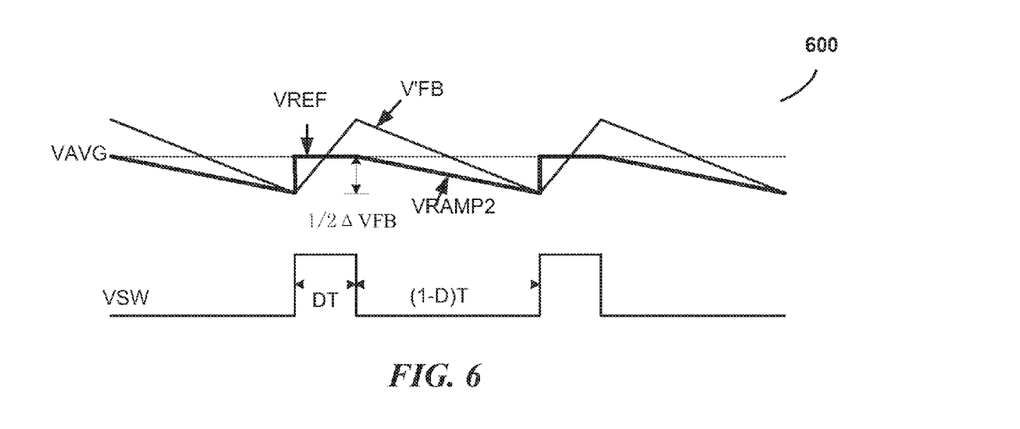
FIG. 6 illustrates a schematic wave-form diagram of the switch-mode power supply system 400 with the second ramp signal generator 408 enabled.

FIG. 6 illustrates a schematic wave-form diagram of the voltage converter 400 with the second ramp signal generator 408 enabled. When the average value VAVG is equal to the reference signal VREF, the actual output signal VOUT will be equal to the desired value. According to formula (4), if a second ramp signal VRAMP2 has an amplitude equal to $$-\frac{1}{2}\Delta VFB,$$

the VAVG=VREF. Supposing that the slope of the second ramp signal VRAMP2 is ramp2, then ramp2 is:

$$ramp2 = -\frac{\frac{1}{2}\Delta VFB}{t} = -\frac{VOUT}{2 \times R3 \times C2} \times \frac{(1-D)T}{t} \quad (t \le T) \quad (5)$$

Wherein, t is the enabled time of the second ramp signal VRAMP2 in a single operation cycle. In one embodiment, t=(1−D)×T, the second ramp signal VRAMP2 is enabled during the off-time of the high side switch M. Therefore the slope ramp2 is constant. At this condition, the slope ramp2 is shown as formula (6)

$$ramp2 = \frac{VOUT}{2 \times R3 \times C2} \quad (6)$$

According to formula (6), the slope ramp2 of the second ramp signal VRAMP2 depends on the output signal VOUT of the power supply system 400, the resistance of resistor R3 in the first ramp signal generator 407, and the capacitance of the capacitor C2. Once the second ramp signal VRAMP2 with a slope ramp2 is added to the non-inverting input terminal of the comparator 404, the actual output signal VOUT may be equal to the desired value.

Figure 7:
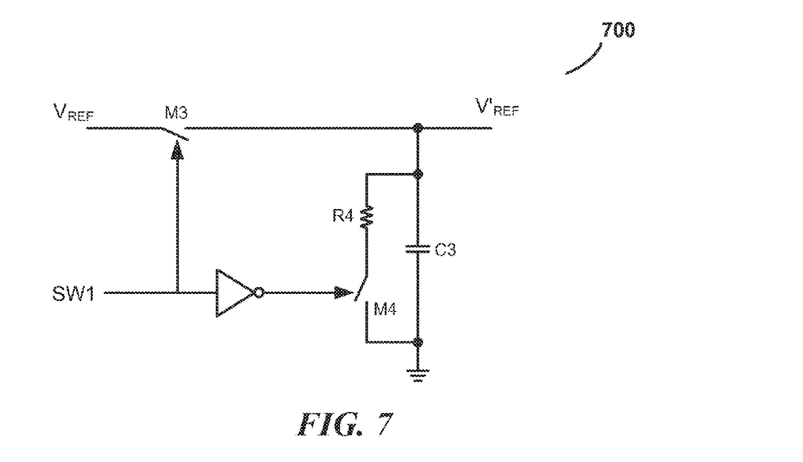
FIG. 7 illustrates a schematic circuitry diagram of a second ramp signal generator 700 according to an embodiment of the present invention.

FIG. 7 illustrates a schematic circuitry diagram of a second ramp signal generator 700 according to an embodiment of the present invention. As shown in FIG. 7, second ramp signal generator 700 comprises switches M3 and M4, an inverter INV, a resistor R4 and a capacitor C3. A first terminal of the switch M3 receives the reference signal VREF, and a second terminal of M3 is coupled to the non-inverting input terminal of comparator 404. A first terminal of the switch M4 is coupled to a first terminal of the resistor R4, and a second terminal of the switch M4 is connected to the reference ground. A first terminal of the capacitor C3 is coupled to a second terminal of the resistor R4. A second terminal of the capacitor C3 is coupled to the reference ground. A control terminal of the switch M3 receives the first driver signal SW1, and a control terminal of the switch M4 is coupled to an output terminal of the inverter INV. An input terminal of the inverter INV is coupled to the first driver signal SW1. Thus the switches M3 and M4 are complementarily turned on and off, and the switch M3 is synchronous to the switch M1 in switch circuit 405.

When the first driver signal SW1 is at high level, the output of the inverter INV is at low level. As a result the switch M3 is turned on and the switch M4 is turned off, and V'REF=VREF. Meanwhile, the capacitor C3 is charged and the voltage across the capacitor C3 is VREF. Once the first driver signal SW1 drops to low level, the inverter INV generates a high level output. The switch M3 is turned off and the switch M4 is turned on. The switch M4 is discharged through a loop comprised by the switch M4 and the resistor R4, and generates the compensated reference signal V'REF. The discharging current Ic3 of the capacitor C3 is:

$$Ic3 = \frac{VREF}{R4} \quad (7)$$

Accordingly, a ramp signal is obtain on the first terminal of capacitor C3. The slope of this ramp signal is:

$$-\frac{VREF}{R4 \times C3} \quad (8)$$

By choosing proper values of the resistor R4 and the capacitor C3 to satisfy the formula (9) in the following, the slope of this ramp signal may be equal to the required slope ramp2 of the second ramp signal VRAMP2.

$$\frac{VREF}{R4 \times C3} = \frac{VOUT}{2 \times R3 \times C2} \quad (9)$$

Figure 8:
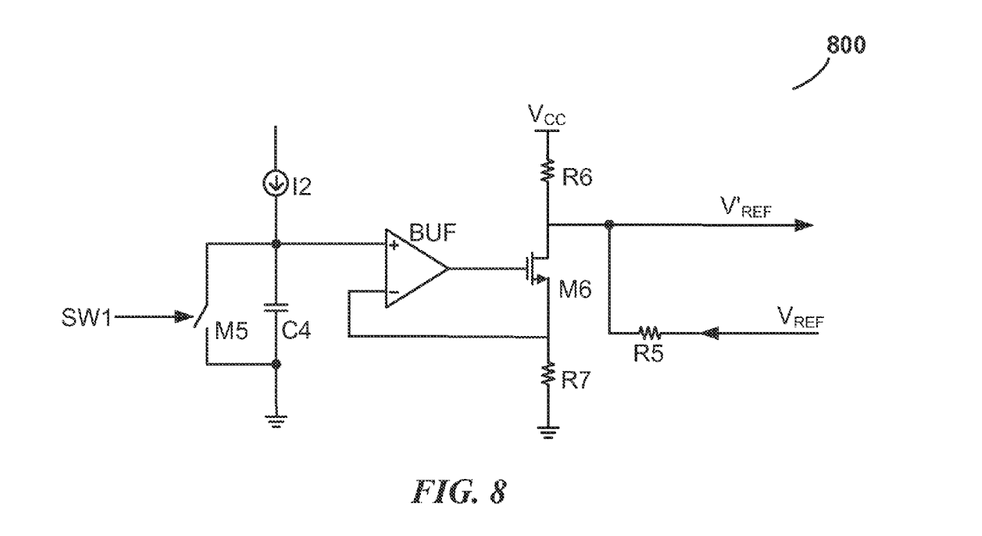
FIG. 8 illustrates a schematic circuitry diagram of another second ramp signal generator 800 according to another embodiment of the present invention.

FIG. 8 illustrates a schematic circuitry diagram of another second ramp signal generator 800 according to another embodiment of the present invention. The illustrated second ramp signal generator 800 comprises a switch M5, a MOSFET M6, a current source 12, a capacitor C4, three resistors R5, R6 and R7, and a buffer comparator BUF. The capacitor C4 is coupled between an output terminal of the current source 12 and the reference ground. The switch M5 is coupled to the capacitor C4 in parallel. The output terminal of the current source 12 is further coupled to a non-inverting terminal of the buffer comparator BUF. A control terminal of the switch M5 receives the control signal SW1. A drain terminal of the MOSFET M6 is coupled to a power supply voltage VCC through the resistor R6, and meanwhile coupled to the reference signal VREF through the resistor R5. The compensated reference signal V'REF is also generated on the drain terminal of the MOSFET M6. A source terminal of the MOSFET M6 is coupled to an inverting terminal of the buffer comparator BUF, and further coupled to the reference ground through the resistor R7. A control terminal of the MOSFET M6 is coupled to an output terminal of the buffer comparator BUF.

In other embodiments, MOSFET M6 may be replaced by other suitable devices, e.g. bipolar junction transistor (BJT), junction field effect transistor (JFET), and etc.

The operation of the switch M5 is synchronous to the switch M1 in switch circuit 405. When the switch M5 is turned off, the current source 12 charges the capacitor C4, the voltage on the non-inverting terminal of the buffer comparator BUF is $$Vc = \frac{I2 \times t}{C4} \quad (10)$$

The MOSFET M6 is operating at linear region. The current flowing through the resistor R7 is $$I_{R7} = \frac{I2 \times t}{C4 \times R7} \quad (11)$$

The voltage on the drain terminal of the MOSFET M6 is $$V_{CC} - \frac{I2 \times t \times R6}{C4 \times R7} \quad (12)$$

When the switch M5 is turned on, the current source 12 is shorted. The capacitor C4 is discharged through the switch M5. The MOFET M6 is off.

By choosing proper resistance values of the resistors, the capacitor and the current source could satisfy the formula (13) in the following, and the ramp slope of the compensated reference signal V'REF may be equal to the required slope ramp2.

$$\frac{I2 \times R6}{C4 \times R7} = \frac{VOUT}{2 \times R3 \times C2} \quad (13)$$

One with ordinary skill in relevant art should understand that in certain embodiments, the switches M3, M4 and M5 shown in FIG. 7 and FIG. 8 may be BJT or MOSFET or other suitable switching device.

Figure 9:
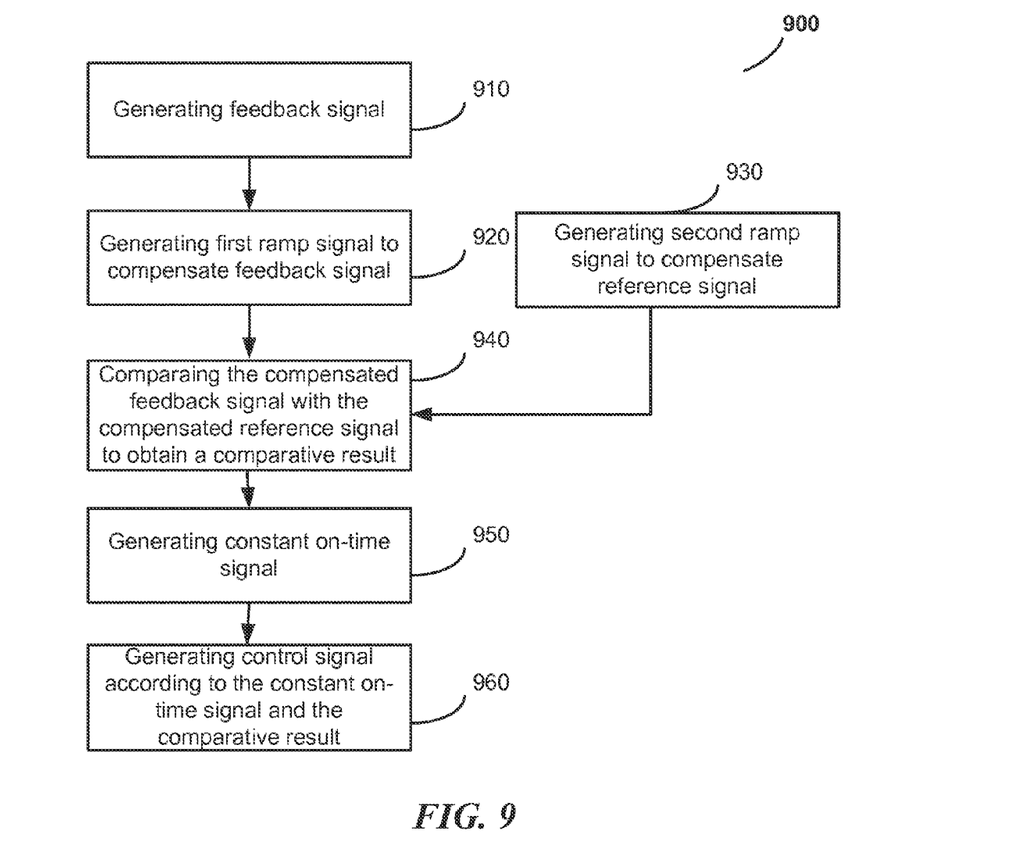
FIG. 9 illustrates a process flow diagram of a method for controlling a switch mode power supply system according to an embodiment of the present invention.

FIG. 9 illustrates a process flow diagram of a method for controlling a switch mode power supply system according to an embodiment of the present invention. The power supply system comprises a switch circuit. The switch circuit comprises at least a power switch. The method in the illustrated embodiment comprises steps 910-960 which are listed as following:

Step 910, generating a feedback signal which is based on the output signal of the power supply system;

Step 920, generating a first ramp signal by means of a first ramp signal generator, and compensating the feedback signal configured to generate a compensated feedback signal;

Step 930, generating a second ramp signal by means of a second ramp signal generator, and compensating a reference signal configured to generate a compensated reference signal;

Step 940, comparing the compensated feedback signal with the compensated reference signal to obtain a comparative result;

Step 950, generating a constant on-time signal by a constant on-time controller; and Step 960, controlling the power switch in the switch circuit turning ON and OFF according to the constant on-time signal and the comparative result.

In one embodiment, the compensated feedback signal is the sum of the feedback signal and the first ramp signal. And in one embodiment, the compensated reference signal is the sum of the reference signal and the second ramp signal.

In the embodiment shown in FIG. 9, the generation of the on-time signal in Step 950 is later than the Step 940. However, one with ordinary skill in relevant art should understand that the Step 950 may be placed before any step of the Steps 910-940 in other embodiments.

In one embodiment, the slope of the second ramp signal may depend on the output signal of the power supply system.

The above description and discussion about specific embodiments of the present invention is for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

I claim:

1. A controller for controlling a switch mode power supply system, wherein the switch mode power supply system comprises a switch circuit that comprises a power switch, and wherein the controller comprises:

a feedback circuit, coupled to an output of the switch mode power supply system, configured to generate a feedback signal that is based on an output signal of the switch mode power supply system;

a first ramp signal generator, coupled to the switch circuit, configured to generate a first ramp signal, the first ramp signal generator compensating the feedback signal with the first ramp signal to generate a compensated feedback signal;

a comparator, having an inverting terminal receiving the compensated feedback signal, and a non-inverting terminal coupled to a reference signal, and an output terminal generating a comparative result;

a constant on-time signal generator, generating a constant on-time signal;

a logic circuit, coupled to the constant on-time signal generator and the output terminal of the comparator, configured to generate a control signal to control the power switch turning ON and OFF; and a second ramp signal generator, configured to generate a second ramp signal according to the control signal, wherein the reference signal is compensated by the second ramp signal before provided to the comparator, so as to make an average value of the compensated feedback signal be equal to the reference signal.

2. The controller according to claim 1, wherein the first ramp signal generator comprises:

a first resistor, having a first terminal coupled to the switch circuit and a second terminal coupled to the inverting terminal of the comparator;

a first capacitor, having a first terminal coupled to the second terminal of the first resistor and a second terminal coupled to a reference ground; and a first current source, having an output terminal coupled to the second terminal of the first resistor.

3. The controller according to claim 2 wherein a slope of the second ramp signal depends on a resistance of the first resistor, a capacitance of the first capacitor and the output signal of the switch mode power supply system.

4. The controller according to claim 1, wherein the second ramp signal generator comprises:

a second current source, having an output terminal;

a second capacitor, having a first terminal coupled to the output terminal of the second current source, and a second terminal;

a third switch, having a first terminal coupled to the first terminal of the second capacitor, a second terminal coupled to the second terminal of the second capacitor, and a control terminal receiving the control signal;

a buffer comparator, having a non-inverting terminal coupled to the output terminal of the second current source, an inverting terminal, and an output terminal;

a transistor, having a first terminal coupled to a power supply voltage through a third resistor, a second terminal coupled to the reference ground through a fourth resistor, and a control terminal coupled to the output terminal of the buffer comparator, wherein the second terminal is further coupled to the inverting terminal of the buffer comparator; and a fifth resistor, having a first terminal receiving the reference signal, and a second terminal coupled to the first terminal of the transistor configured to generate the compensated reference signal.

5. The controller according to claim 1, wherein the second ramp signal generator comprises:

a first switch, having a first terminal coupled to the reference signal, a second terminal coupled to the non-inverting terminal of the comparator, and a control terminal coupled to the control signal;

a second switch, having a first terminal, a second terminal coupled to a reference ground, and a control terminal;

a second resistor, having a first terminal coupled to the first terminal of the second switch, and a second terminal coupled to the second terminal of the first switch;

a second capacitor, having a first terminal coupled to the second terminal of the second resistor, and a second terminal coupled to the reference ground; and an inverter, coupled between the control terminal of the second switch and the control terminal of the first switch.

6. The controller according to claim 5, wherein the reference signal is provided to the non-inverting terminal of the comparator directly when the power switch is ON, and wherein the reference signal is compensated by the second ramp signal generator before provided to the non-inverting terminal of the comparator when the power switch is OFF.

7. A control method for controlling a switch mode power supply system, the switch mode power supply system comprising a switch circuit that comprises at least a power switch, the control method comprises:

generating a feedback signal which is based on an output signal of the switch mode power supply system;

compensating the feedback signal with a first ramp signal to obtain a compensated feedback signal;

comparing the compensated feedback signal with a reference signal configured to obtain a comparative result;

generating an constant on-time signal;

generating a control signal according to the constant on-time signal and the comparative result configured to control the power switch ON and OFF; and generating a second ramp signal according to the control signal, wherein the reference signal is compensated by the second ramp signal before compared with the compensated feedback signal, so as to make an average value of the compensated feedback signal be equal to the reference signal.

8. The control method according to claim 7, wherein compensating the feedback signal with the first ramp signal is adding the first ramp signal to the feedback signal.

9. The control method according to claim 7, further comprising relating a slope of the second ramp signal to a slope of the first ramp signal.

10. The control method according to claim 7, wherein the reference signal is directly compared with the compensated feedback signal when the power switch is ON, and wherein the reference signal is compensated by the second ramp signal before compared with the compensated feedback signal when the power switch is OFF.

11. The control method according to claim 7, wherein a slope of the second ramp signal depends on the output signal.

12. The control method according to claim 7, wherein compensating the reference signal is adding the second ramp signal to the reference signal.

\* \* \* \* \*